Feb. 19, 1963 A. F. WEBER 3,077,915
PNEUMATIC TIRE
Filed Dec. 29, 1959 2 Sheets-Sheet 1

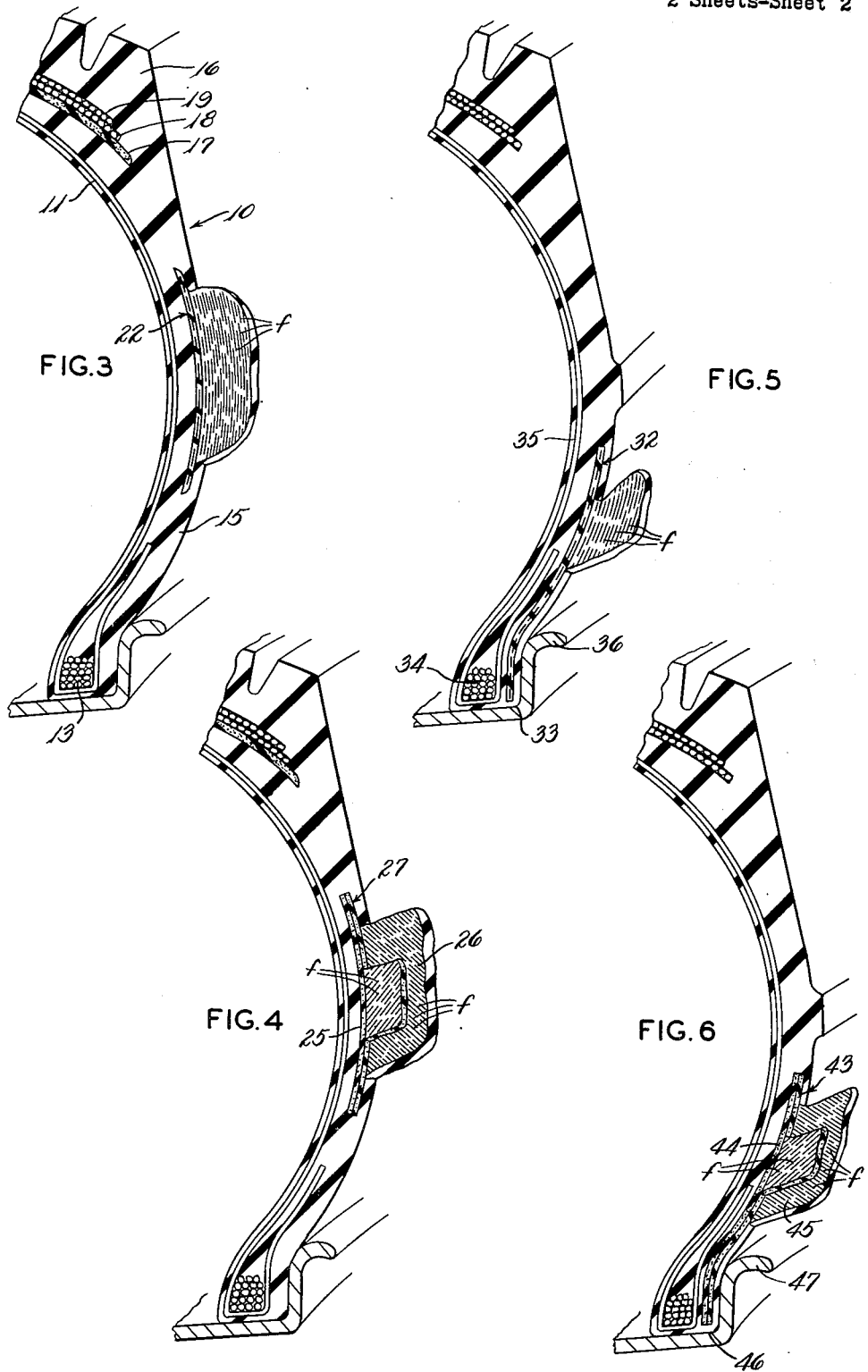

3,077,915
PNEUMATIC TIRE
Arthur Frederick Weber, Akron, Ohio, assignor to The Firestone Tire & Rubber Company, Akron, Ohio, a corporation of Ohio
Filed Dec. 29, 1959, Ser. No. 862,523
11 Claims. (Cl. 152—355)

This invention relates to pneumatic tires and more particularly to wire tires having a construction which provides a high degree of dimensional stability.

Essentially the invention comprises a tire construction in which a high degree of tire stability and improved handling is provided by two tread plies or layers of wire fabric, with the wire cables of one ply extending at equal and opposite angles to those of the other ply, in combination with additional layers of fiber-reinformed rubber in which the majority of the reinforcing fibers are oriented to lie in a direction parallel to each other.

All of these components, the two wire plies and the fiber-reinforced material, cooperate to produce a tire which has a high degree of dimensional stability, holding to a minimum the scuffing, separation, chafing and flexing which tends to take place to a marked degree in the operation of conventional tires. As a result, the tire of the present invention has a long life and delivers low-cost mileage.

The oriented fiber material cooperates with the other tire components to produce the desired dimensional stability and to reinforce the tire, and to impart to the tire good handling and steering characteristics, which otherwise tend to be lacking in such tires.

The tires embodying the invention are easy and economical to manufacture, they require no special manufacturing methods and can readily be shaped and vulcanized.

These advantages and other objects and advantages of the invention will be more readily apparent from a description of several forms of the invention, reference being had to the accompanying drawings in which:

FIGURE 3 is an enlarged, fragmentary, sectional view of one of the sidewalls of the tire of FIGURE 1;

FIGURE 4 is a view similar to FIGURE 3, showing a modification of the invention in which the direction of the orientation in one fiber-reinforced ply crosses the direction of orientation in the other fiber-reinforced ply;

FIGURE 5 is a fragmentary sectional view of one wall of a tire showing another modification, embodying oriented fiber material in the bead area of the tire; and FIGURE 6 is a view similar to FIGURE 5 showing yet another modification in which the direction of orientation in one fiber-reinforced ply crosses the direction of orientation in the other fiber-reinforced ply.

Figure 1:
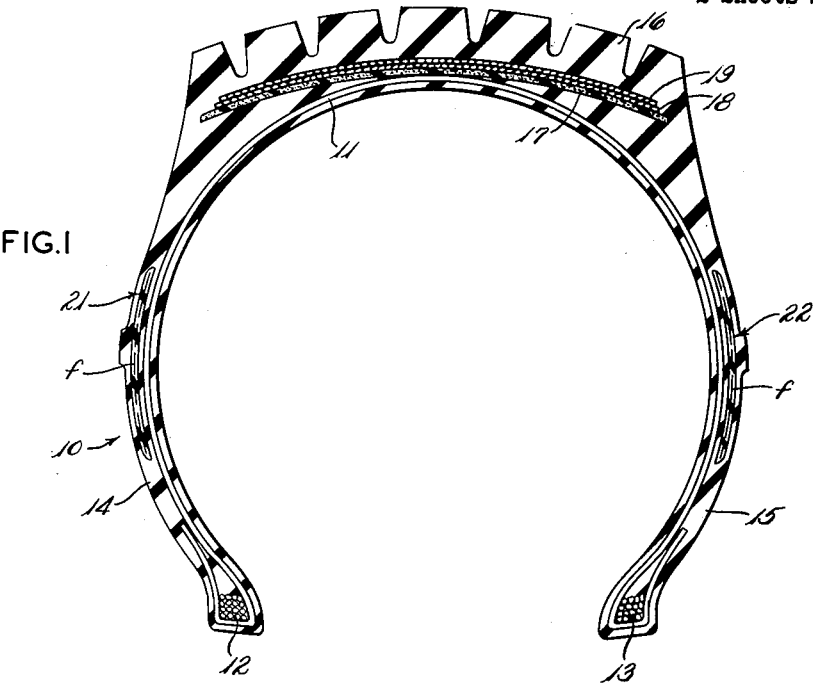
FIGURE 1 is a sectional view, taken in a radial plane, of a tire embodying the invention.

The invention is described with reference to FIGURE 1 as embodied in a 10.00–20 highway truck tire, but it will be apparent that it will be useful in other types of tires both for highway and off-the-road use and in tires for other vehicles and other conditions and types of service. Such a tire, which is indicated generally at 10, comprises a single body ply 11 of wire cables which extend at 0° to the rolling axis of the tire, the ends of which are wrapped around and anchored to inextensible cores to form the beads indicated at 12 and 13, respectively. Sidewalls 14 and 15 and a tread portion 16 complete the tire.

A high degree of dimensional stability is imparted to the tread portion 16 by three tread plies indicated, respectively, at 17, 18 and 19, two of which are substantially the same width as the tread portion. The tread ply 17 lies in the crown area of body ply 11 and comprises rubber reinforced with oriented fibers $f$ which will be described in more detail later. The plies 18 and 19 are wire fabric tread plies in which the wire cables of each ply are parallel to each other and extend at angles within a range of 60° to 80°, and preferably at an angle of about 70° to the rolling axis of the tire. The cables of ply 18 extend oppositely to and across those of ply 19.

In this particular example, the tread ply 17 is substantially the same gauge as the wire plies 18 and 19, the gauge being about 0.080 inch thick, and the rubber fiber tread ply 17 has a modulus of about 1300 p.s.i. at 20% elongation. Obviously the gauge of tread ply 17 and the modulus and other characteristics of the rubber compound will vary depending upon the tire and the service to which it will be subjected.

Figure 2:
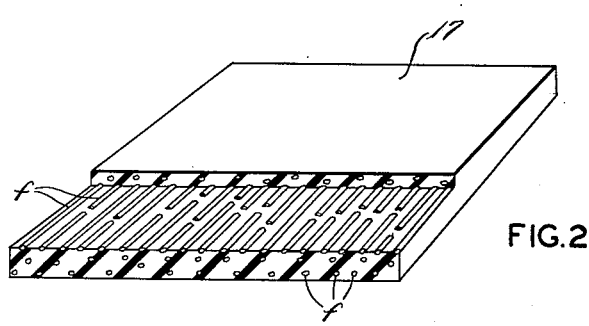
FIGURE 2 is an enlarged, perspective view showing a portion of the oriented fiber material which comprises some of the tire components.

Further stability and reinforcement, as well as resistance to flexing and separation of tire components, are imparted to the tire through the provision of fiber-reinforced stabilizer pads 21 and 22 in the sidewalls 14 and 15. These stabilizer pads 21 and 22 are of the same general construction as that of tread ply 17 shown in FIGURE 2 and are reinforced by fibers $f$ which, in this particular instance, are of nylon, the majority of which are oriented to lie parallel to each other. In this example, about 90% and more of the nylon fibers are oriented to lie parallel to each other in the same direction, see FIGURE 3, while the remainder of the fibers are somewhat less oriented. The required degree of orientation is conveniently produced by conventional milling and calendering operations. The nylon fibers range in denier from about 1½ to 6 and range in length from about 1 to 1¼ inches and consist of about 2–5% by weight of the tread ply material.

Fibers other than nylon may be used to advantage; for example, fibers such as cotton, rayon, Dacron, glass fibers, Saran, polypropylene, polyethylene, mineral, steel or other suitable metal fibers may also be used. For example, excellent results will be obtained if the rubber ply is reinforced with steel fibers in the order of about 0.0059 inch in gauge and about ⅞ inch in length.

The direction of orientation of the fibers $f$ in the tread ply is about 0°–30° to the rolling axis of the tire.

In the stabilizer pads 21 and 22, the direction of orientation, as best seen in FIGURE 3, is generally parallel to the 0° direction of the tire body ply 11, or generally radial of the tire.

The stabilizer pads are shown in FIGURE 1 as being located radially outwardly of the body ply, but it will be clear to those skilled in the art that they may be located inwardly of the tire body ply, or between body plies where more than one is provided. The stabilizer pads are located in the central portion of the tire sidewalls, and extend between 15 and 45%, but preferably 30% of the radial height of the tire.

Alternatively, the stabilizer pads may be formed of two or more layers of plies 25 and 26 of rubberized, oriented fiber material, to produce a single pad 27 as shown in FIGURE 4. In the case of using two plies, however, the directions of orientation of the fibers cross and extend, respectively, at angles of up to 90°, but preferably between 30° and 60°. The angles in the present example are usefully both about 45° and are measured with reference to a line perpendicular to the radial plane of the tire where the crossing fibers intersect. Where a single ply only is used, the angle of direction of fiber-orientation is measured with respect to the tangent to the inner bead circumference, where the radial plane of the tire, passing through such fiber, intersects the circumference.

In the instant case, the crossing fibers of the plies will further reinforce the body to produce maximum stability in the tire body.

In the modification of the invention illustrated in FIGURES 5 and 6, respectively, the reinforcement of the tire through the use of stabilizer pads has been moved into the area of the lower sidewall and bead region of the tire. As shown for example in FIGURE 5, a single stabilizer pad 32 is provided, which extends from about the axially inner portion 33 of the bead 34 radially outwardly to provide increased stability and stiffness to the tire to prevent premature failure due, for example, to separation of tire components due to excessive flexing in the lower tire sidewall and bead area.

In this modification, the direction of fiber-orientation is substantially radial of the tire, or in the case of the present example, parallel to the 0° direction of the body cord ply 35.

Another mode of providing these stabilizer pads is shown in FIGURE 6, wherein the pad is indicated at 43 and comprises two plies 44 and 45 of rubber reinforced with oriented fiber material. The directions of orientation of the fibers in these plies cross and extend, respectively, at angles of up to 90°, but preferably between 30° and 60°, again measured as in the case of the pads described in, for example, FIGURE 4. In the example of FIGURE 6, the angles are usefully shown at 45° for each ply, and are measured from a line perpendicular to the radial tire plane passing through the intersection of the crossing fiber. Again, as in the example shown in FIGURE 5, the pad 43 extends radially outwardly from the inner bead area 46.

It has been found useful to extend the stabilizer pads of the modifications shown in FIGURES 5 and 6 from the region upward into the sidewall area for a distance of between 15 and 45% of the radial height of the tire; it is preferable, however, that the pads should extend about 30% upward into the tire sidewall. In this case, the pads impart improved tire handling characteristics and additional stability to the sidewalls of the tire, reduce fatigue and prevent separation of the ply material within the tire, and prevent excessive chafing and tire damage due to roll-over of the tire sidewall onto the rim flanges 36 and 47.

While several forms of the invention have been described by way of example in connection with a tire comprising a wire cable body ply, with the cables extending at an angle of 0°, the invention can be practiced with tires of differing body constructions and characteristics. For example, the body ply need not be of wire cable; it may be of any suitable textile fabric. One or more body plies may be used, if desired, and the bias angle of the wire cables or textile cords of the body plies may extend not only at 0° but also at any one of the other conventional bias angles.

Also, in the several forms of the invention just described, the fiber-reinforced plies are described as being located immediately adjacent to and outside the outermost body ply or tire bead. It will be apparent that such plies may also be located, with advantage, either between or beyond ply layers or within the bead construction.

Also, with varying demands in service and with different types of tires, the location of the stabilizer pads, while still being under the tire sidewall, can be changed so that the stabilizer may be located between the body ply and its turned-up end, or between the turned-up body ply end and a chafer strip.

What is claimed is:

1. A pneumatic tire comprising a radial cord body ply structure anchored to circumferentially extending beads, a tread and sidewalls overlying said body ply, tread plies underlying the tread with the cords of each of said tread plies extending parallel to each other, and means extending generally radially a substantial distance in the sidewalls of said tire adjacent said body ply and having the radially outer edge of said means spaced radially a substantial distance from said tread plies to stabilize said radial body structure, said means comprising elastomeric material having dispersed therein discrete, individual, discontinuous fibers the majority of which are oriented in a single direction.

2. A pneumatic tire as in claim 1, wherein said means are spaced from said tire beads.

3. A pneumatic tire as in claim 1, in which said discontinuous fibers comprise metallic elements.

4. A pneumatic tire as in claim 1, in which said discontinuous fibers comprise textile elements.

5. A pneumatic tire as in claim 1, in which said discontinuous fibers comprise mineral elements.

6. A pneumatic tire as in claim 1, in which the direction of fiber orientation in said means extends at an angle of 90° with said beads.

7. A pneumatic tire as in claim 1, in which the radial extent of said means is between 15 and 45% of the distance between said tread and said beads.

8. A pneumatic tire as in claim 1, in which the radial extent of said means is about 30% of the distance between said tread and said beads.

9. A pneumatic tire as in claim 1, in which said means comprises two plies, whose directions of fiber orientation cross.

10. A pneumatic tire as in claim 9, in which said directions of orintation extend at angles between 30° and 60° to said beads.

11. A pneumatic tire as in claim 9, in which said directions of orientation extend at angles of about 45% to said beads.

References Cited in the file of this patent

UNITED STATES PATENTS

| | | |
|---|---|---|
| 1,117,994 | Freeman | Nov. 24, 1914 |
| 1,214,670 | Geer | Feb. 6, 1917 |
| 1,228,099 | Dew | May 29, 1917 |
| 1,689,119 | Evans | Oct. 23, 1928 |
| 1,894,237 | Mallory | Jan. 10, 1933 |
| 2,013,553 | Day | Sept. 3, 1935 |
| 2,056,012 | Madge et al. | Sept. 29, 1936 |
| 2,063,105 | King | Dec. 8, 1936 |
| 2,493,614 | Bourdon | Jan. 3, 1950 |
| 2,937,684 | Rockoff | May 24, 1960 |
| 2,960,139 | Engstrom et al. | Nov. 15, 1960 |
| 3,018,814 | Saint-Paul | Jan. 30, 1962 |

FOREIGN PATENTS

| | | |
|---|---|---|
| 598,804 | Germany | June 18, 1934 |

OTHER REFERENCES

Continental: German application 1,029,693, printed May 8, 1958 (KI63e 5/01).

UNITED STATES PATENT OFFICE
CERTIFICATE OF CORRECTION

Patent No. 3,077,915            February 19, 1963

Arthur Frederick Weber

It is hereby certified that error appears in the above numbered patent requiring correction and that the said Letters Patent should read as corrected below.

Column 4, line 41, for "45%" read -- 45° --.

Signed and sealed this 24th day of September 1963.

(SEAL)
Attest:

ERNEST W. SWIDER
Attesting Officer

DAVID L. LADD
Commissioner of Patents